US006765599B2

(12) United States Patent
Nagai et al.

(10) Patent No.: US 6,765,599 B2
(45) Date of Patent: Jul. 20, 2004

(54) IMAGE SIGNAL TRANSMISSION APPARATUS

(75) Inventors: Takaaki Nagai, Daito (JP); Hideki Kasamatsu, Katano (JP)

(73) Assignee: Sanyo Electric Co., Ltd., Osaka (JP)

( * ) Notice: Subject to any disclaimer, the term of this patent is extended or adjusted under 35 U.S.C. 154(b) by 206 days.

(21) Appl. No.: 09/866,705

(22) Filed: May 30, 2001

(65) Prior Publication Data

US 2002/0005863 A1 Jan. 17, 2002

(30) Foreign Application Priority Data

May 30, 2000 (JP) ....................................... 2000-159409
Jun. 1, 2000 (JP) ....................................... 2000-164479
Jan. 31, 2001 (JP) ....................................... 2001-023206

(51) Int. Cl.[7] .................................................. H04N 7/16

(52) U.S. Cl. ......................... 345/969; 345/520; 348/12; 348/13; 348/17; 348/212; 348/409.1; 348/441

(58) Field of Search ................................ 345/520, 969; 348/12, 13, 17, 212, 409.1, 441

(56) References Cited

U.S. PATENT DOCUMENTS 3,674,927 A * 7/1972 Jordan, Jr. .................. 348/615
4,027,331 A * 5/1977 Nicol .................... 375/240.12
4,222,973 A * 9/1980 Kasper et al. .............. 264/430
5,230,015 A * 7/1993 Yokodate et al. ........ 348/14.12
5,568,185 A * 10/1996 Yoshikazu ................... 348/22
6,384,862 B1 * 5/2002 Brusewitz et al. ..... 348/211.99
6,400,463 B2 * 6/2002 Kitamura et al. .......... 358/1.15
6,493,042 B1 * 12/2002 Bozdagi et al. ............. 348/700
6,498,625 B1 * 12/2002 Yamamoto et al. ...... 348/384.1

FOREIGN PATENT DOCUMENTS

JP 2001-251385 9/2001

OTHER PUBLICATIONS

"Digital Visual Interface" Rev. 1.0—Apr. 2, 1999, pp. 1–76.
Japanese Office Action dated Oct. 14, 2003.

* cited by examiner

*Primary Examiner*—Bipin Shalwala
*Assistant Examiner*—Vincent E. Kovalick
(74) *Attorney, Agent, or Firm*—Arent Fox, PLLC.

(57) ABSTRACT

An image-transmitting-side device comprises: a one-phase to two-phase converter circuit for separating parallel image data, which are to be transmitted, into even and odd data; a first parallel-serial converting circuit; a second parallel-serial converting circuit; means for allowing a user to select, as the resolution mode for the image data to be transmitted, one of a first resolution mode and a second resolution mode that is higher in resolution than the first resolution mode; and switch means for applying the parallel image data, which are to be transmitted, to the first parallel-serial converting circuit when the first resolution mode is selected, and for applying the parallel image data, which are to be transmitted, to the one-phase to two-phase converter circuit when the second resolution mode is selected.

12 Claims, 12 Drawing Sheets

IMAGE SIGNAL TRANSMISSION APPARATUS

BACKGROUND OF THE INVENTION

1. Field of the Invention

This invention relates to an image signal transmission apparatus for transmitting image signals produced in a personal computer to a display device, such as a liquid crystal projector, plasma display panel (PDP) or the like, which is relatively remote from the personal computer.

2. Description of the Prior Art

[1] In a case of transmitting image signals produced in a personal computer to a display device via an analog transmission cable, if the analog transmission cable is long, it is apt to cause image deterioration. Such image deterioration will be noticeable especially on the display device having a high resolution of 1024.times.768 pixels (XGA), 1280.times.1024 pixels (SXGA) or the like.

Some image signal transmission apparatus have already been developed that cause no image deterioration even when the transmission cables are long. An example of those apparatus is "PanelLink" by Silicon Image, Inc. in the United States, which has been developed based on a signal transmission technology called TMDS (Transition Minimized Differential Signaling).

According to this signal transmission technology of TMDS, red, blue and green signals (RGB) and a clock signal are serially transmitted in a differential method. This differential method, which is a method for transmitting a single signal by use of two transmission lines, realizes noise immunity and a stable signal transmission and further achieves a high transmission speed and a long-distance cable transmission. It becomes, however, difficult for this method to provide such transmissions if the resolution of image data is further raised up to an ultrahigh resolution of 1600.times.1200 pixels (UXGA), 2048.times.1536 pixels (QXGA) or the like which causes the transmission cable to reach its own physical limit. As a solution to this problem, there has been proposed "Dual Link Method" by the DDWG (Digital Display Working Group) in its DVI (Digital Visual Interface) specification. Unlike the conventional "PanelLink" (which will be referred to as "Single Link" method in contrast to the "Dual Link" method hereinafter), the "Dual Link" method transmits the R, G, and B signals, by use of not a respective single channel for each signal, that is, three channels but two channels for each signal, that is, six channels, after performing a one-phase to two-phase conversion of each signal. In this way, the "Dual Link" method can ensure a bandwidth that is twice as wide as that of the "Single Link" method, allowing the image transmission of an ultrahigh resolution, such as UXGA, QXGA or the like. Additionally, the one-phase to two-phase conversion of each signal can reduce the required transmission rate and hence realizes the signal transmission through a longer cable.

FIGS. 1 and 2 show the structures of signal transmission apparatus employing the "Single Link" and "Dual Link" methods, respectively.

In the signal transmission apparatus employing the "Single Link" method, a PanelLink transmitter 301 receives image data represented by parallel signals and performs a parallel-serial conversion of the image data from the parallel signals to serial signals. The image data of serial-converted signals are transmitted through a cable 302 to a PanelLink receiver 303. The cable 302 comprises three pairs of signal lines for transmitting the image data and one pair of signal lines for transmitting a clock signal. The PanelLink receiver 303 performs a serial-parallel conversion of the received serial signals to the parallel signals.

In the signal transmission apparatus employing the "Dual Link" method, the even data of image data represented by parallel signals are applied to a PanelLink transmitter 401, while the odd data of the image data are applied to a PanelLink transmitter 402. The PanelLink transmitters 401 and 402 each perform a parallel-serial conversion of the received image data from the parallel signals to serial signals.

The even data of the image data that have been converted into the serial signals by the PanelLink transmitter 401 are transmitted through a cable 403 to a PanelLink receiver 404. The odd data of the image data that have been converted into the serial signals by the PanelLink transmitter 402 are transmitted through the cable 403 to a PanelLink receiver 405. The cable 403 comprises six pairs of signal lines for transmitting the image data and one pair of signal lines for transmitting a clock signal. The PanelLink receivers 404 and 405 each perform a serial-parallel conversion of the received serial signals to the parallel signals.

The object of the present invention is to provide an image signal transmission apparatus that allows the transmission of image signals to be done by use of a transmission method suitable for the resolution of the image signals.

[2] If, in the "Dual Link" method of FIG. 2, the RGB image data represented by the parallel signals are not separated into even and odd data but are applied to the PanelLink transmitter 401 as they are, and if the PanelLink receiver 404 only is activated, while the PanelLink transmitter 402 and PanelLink receiver 405 not being activated, then it would correspond to the "Single Link" method of FIG. 1.

It is difficult for the "PanelLink" method to effect the transmission of an ultrahigh resolution, such as UXGA, QXGA or the like, and/or effect a long-distance transmission. Thus, in the case of effecting such an ultrahigh resolution transmission and/or a long-distance transmission, the "Dual Link" method is effective.

On the other hand, in the case of transmitting the signal of a low-resolution, such as VGA or the like, the "Single Link" method works to a sufficient degree. In addition, because of an increasing demand for portability of the apparatus on the image transmitting side, such as a personal computer or the like, and that on the image receiving side, such as a liquid crystal projector or the like, the need to reduce the power consumption has become important. Thus, when a low-resolution signal is transmitted or when no long-distance transmission is required, it is more desirable to effect the signal transmission by use of the "Single Link" method.

The object of the present invention is to provide an image signal transmission apparatus that allows the transmission of image signals to be done by use of a transmission method suitable for the resolution of the image signals and for the cable length. [3] In a case of transmitting image signals produced in a personal computer to a liquid crystal projector via an analog transmission cable, if the analog transmission cable is long, it is apt to cause image deterioration. Such image deterioration will be noticeable especially on the liquid crystal projector having a high resolution of 1024.times.768 pixels (XGA), 1280.times.1024 pixels (SXGA) or the like.

There have already been developed some image signal transmission apparatus that can avoid image deterioration even when the transmission cable is long. An example thereof is "FPDLink" developed by National Semiconductor Corp. in the United States. This image signal transmission apparatus is also called "LVDS."

Another example is "PanelLink" by Silicon Image, Inc. in the United States.

FIG. 3 shows the structure of "PanelLink," which comprises a graphics controller (graphics board) 151 built in a personal computer, a transmitting-side unit 152, a receiving-side unit 153, and a cable 154 for connecting the transmitting-side unit 152 and the receiving-side unit 153.

The transmitting-side unit 152 includes an encoding/parallel-serial converting circuit 161, a PLL circuit 162, and an amplitude control circuit 163. The encoding/parallel-serial converting circuit 161 receives image data, DE (i.e., a display enable signal for discriminating between a display mode and a standby mode), and a control signal from the graphics controller 151.

In the encoding/parallel-serial converting circuit 161, a parallel-serial conversion of the 24-bit parallel image data is performed, whereby the number of signal lines can be reduced and hence the signal transmission can be effected through a thin cable. Then, the signal amplitude is reduced so as to reduce EMI noise. Additionally, the encoding is performed at the time of the parallel-serial conversion. When the encoding is performed, the variation of the level of the signals to be transmitted is reduced so as to further reduce the EMI noise.

The PLL circuit 162 generates a clock signal for the encoding/parallel-serial converting circuit 161 on the basis of a clock signal applied from the graphics controller 151.

The cable 154 comprises three pairs of signal lines for transmitting the codes including the image data and the control signal, and one pair of signal lines for transmitting the clock signal generated by the PLL circuit 162.

The amplitude control circuit 163 adjusts, in accordance with the resistance value of a single external resistor 165, the amplitude of the signals (i.e., the codes including the image data and the control signal, and the clock signal) to be applied from the transmitting-side unit 152 to the cable 154. Specifically, the signal amplitude can be adjusted within a range between 0.5 V and 2.5 V by establishing the resistance value of the single external resistor 165.

The receiving-side unit 153 includes a data extracting/serial-parallel converting/decoding circuit 181 and a PLL circuit 182. The data extracting/serial-parallel converting/decoding circuit 181 performs a data extraction, a serial-parallel conversion and a decoding with respect to the codes applied from the transmitting-side unit 152 to produce the image data, DE and the control signal.

The PLL circuit 182 produces a clock signal for the data extracting/serial-parallel converting/decoding circuit 181 on the basis of the clock signal applied from the transmitting-side unit 152.

The image data, DE and control signal produced by the data extracting/serial-parallel converting/decoding circuit 181 and the clock signal produced by the PLL circuit 182 are applied to a liquid crystal panel 155 of digital drive type.

The "LVDS" method is similar to the "PanelLink" method but different therefrom in that the total number of the signal lines in the cable is five because of performing neither encoding nor decoding.

FIG. 4 shows the structure of an image signal transmission apparatus that has already been developed by the Applicant of the subject application (See Japanese Official Gazette of Laid Open Patent Application, TOKUKAI, No. 2000-341177.) In FIG. 4, elements corresponding to the same elements in FIG. 3 are identified by the same reference designations, and the explanation of those elements is omitted.

The image signal transmission apparatus of FIG. 4, which utilizes the conventional "PanelLink", comprises a transmission unit 10 set in a personal computer (which is not shown and which will be referred to as "PC" hereinafter) 1, a receiving-side unit 153 set in a liquid crystal projector 20, and a cable 154 for connecting the transmission unit 10 and the receiving-side unit 153.

The transmission unit 10 comprises a graphics controller (graphics board) 151 and a transmitting-side unit 152 connected thereto. The graphics controller 151 is connected to a main CPU 2 in the PC 1 via a bus 3 also therein. The transmitting-side unit 152 in the transmission unit 10 is connected to the receiving-side unit 153 via the cable 154.

The receiving-side unit 153 in the liquid crystal projector 20 is connected to a liquid crystal panel 155 of digital drive type also in the liquid crystal projector 20.

An amplitude control circuit 163 adjusts, in accordance with the resistance value of an external variable resistor circuit 164, the amplitude of the signals (i.e., the codes including the image data and the control signal, and the clock signal) to be provided from the transmitting-side unit 152 to the cable 154. The variable resistor circuit 164 can be switched, for example, between two resistance values to thereby switch, between two values, the amplitude of the signals to be provided from the transmitting-side unit 152 to the cable 154.

An application software for setting the cable length has been installed on the PC 1. When setting the cable length, the user initiates this application software. When this application software is initiated, the PC 1 produces, on its display device, an on-screen selection guide for instructing the user to designate the length of the cable 154 actually being used. The user selects a cable length, following the on-screen selection guide.

When the user selects the cable length, the PC 1 sends a command signal (amplitude command signal) responsive to the cable length selected by the user to the graphics controller 151 via the bus 3. Receiving this command signal, the graphics controller 151 sends an amplitude control signal responsive to the command signal to the variable resistor circuit 164 to change the resistance value thereof.

According to the image signal transmission apparatus of FIG. 4, the user can adjust, in accordance with the cable length, the amplitude of the signals to be provided from the transmitting-side unit 152 to the cable 154 by operating the PC 1 in which the graphics controller 151 has been disposed.

Meanwhile, in the image signal transmission apparatus of the "LVDS" or "PanelLink" method, if the amplitude of signals to be transmitted is enlarged, it increases the possible distance of transmission by the cable but also increases unwanted radiation signals. In contrast to this, if the amplitude of signals to be transmitted is reduced, it reduces the unwanted radiation signals but also reduces the possible transmission distance.

Thus, it is desirable to optimize the signal amplitude according to the cable length. The "LVDS" method, however, has no function to adjust the signal amplitude. As described above, the "PanelLink" method indeed has the function to adjust the signal amplitude by use of the single external resistor 165. However, since the external resistor 165 is disposed at the stage of design, it is difficult for the user to adjust the signal amplitude according to the cable length.

Additionally, in the case of the image signal transmission apparatus of FIG. 4, it was necessary for the user to enter into the PC 1 the amplitude control command for changing the amplitudes of the signals to be provided from the transmitting-side unit to the cable, according to the cable length.

It was, therefore, necessary to preinstall the cable length setting application software onto the PC 1. Additionally, at the time of setting the cable length, it was necessary for the user to initiate this cable length setting application software to cause the on-screen selection guide for setting the cable length to be displayed on the PC 1, and then select the cable length, following this on-screen selection guide.

Moreover, each time changing a cable for another having a different length, the user had to enter an amplitude control command into the computer.

The object of the present invention is to provide an image signal transmission apparatus that does not necessitate the user's setting of the cable length but automatically adjusts the amplitude of signals to be applied from the image transmitting-side unit in response to the level of the received signals that varies with the cable length.

SUMMARY OF THE INVENTION

A first image signal transmission apparatus according to the present invention performs a parallel-serial conversion of parallel image data by use of an image-transmitting-side device, thereafter transmits the image data to an image-receiving-side device via a cable, and then performs a serial-parallel conversion of the received image data by use of the image-receiving-side device, said image-transmitting-side device comprising: a one-phase to two-phase converter circuit for separating the parallel image data, which are to be transmitted, into even and odd data; a first parallel-serial converting circuit; a second parallel-serial converting circuit; means for allowing a user to select, as the resolution mode for the image data to be transmitted, one of a first resolution mode and a second resolution mode that is higher in resolution than the first resolution mode; and switch means for applying the parallel image data, which are to be transmitted, to the first parallel-serial converting circuit when the first resolution mode is selected, and for applying the parallel image data, which are to be transmitted, to the one-phase to two-phase converter circuit when the second resolution mode is selected; wherein when the second resolution mode is selected, the even data obtained by the one-phase to two-phase converter circuit are applied to one of the first and second parallel-serial converting circuits, and the odd data obtained by the one-phase to two-phase converter circuit are applied to the other parallel-serial converting circuit.

A second image signal transmission apparatus according to the present invention performs a parallel-serial conversion of parallel image data by use of an image-transmitting-side device, thereafter transmits the image data to an image-receiving-side device via a cable, and then performs a serial-parallel conversion of the received image data by use of the image-receiving-side device, said image-transmitting-side device comprising: a one-phase to two-phase converter circuit for separating the parallel image data, which are to be transmitted, into even and odd data; a first parallel-serial converting circuit; a second parallel-serial converting circuit; means for automatically determining the resolution of the image data to be transmitted, and then automatically selecting, as the resolution mode for the image data to be transmitted, one of a first resolution mode and a second resolution mode that is higher in resolution than the first resolution mode; and switch means for applying the parallel image data, which are to be transmitted, to the first parallel-serial converting circuit when the first resolution mode is selected, and for applying the parallel image data, which are to be transmitted, to the one-phase to two-phase converter circuit when the second resolution mode is selected; wherein when the second resolution mode is selected, the even data obtained by the one-phase to two-phase converter circuit are applied to one of the first and second parallel-serial converting circuits, and the odd data obtained by the one-phase to two-phase converter circuit are applied to the other parallel-serial converting circuit.

In the above-described first or second image signal transmission apparatus, said image-receiving-side device comprises: a first serial-parallel converting circuit for converting the serial data, transmitted from the first parallel-serial converting circuit via the cable, to the parallel data; and a second serial-parallel converting circuit for converting the serial data, transmitted from the second parallel-serial converting circuit via the cable, to the parallel data.

The above-described first serial-parallel converting circuit includes means for performing a one-phase to two-phase conversion of the parallel data obtained by the serial-parallel conversion to provide separated even and odd data in the case when the first resolution mode is selected.

A third image signal transmission apparatus according to the present invention performs a parallel-serial conversion of parallel image data by use of an image-transmitting-side device, thereafter transmits the image data to an image-receiving-side device via a cable, and then performs a serial-parallel conversion of the received image data by use of the image-receiving-side device, said image-receiving-side device comprising: means for detecting the level of the signals transmitted from the image-transmitting-side device through the cable to the image-receiving-side device and for generating an operation mode control signal for designating a first operation mode when the detected signal level is higher than a predetermined value and for designating a second operation mode when the detected signal level is equal to or lower than the predetermined value; and means for transmitting the operation mode control signal to the image-transmitting-side device, said image-transmitting-side device comprising: a one-phase to two-phase converter circuit for separating the parallel image data, which are to be transmitted, into even and odd data; a first parallel-serial converting circuit; a second parallel-serial converting circuit; and switch means for applying the parallel image data, which are to be transmitted, to the first parallel-serial converting circuit when the operation mode control signal from the image-receiving-side device designates the first operation mode, and for applying the parallel image data, which are to be transmitted, to the one-phase to two-phase converter circuit when the operation mode control signal from the image-receiving-side device designates the second operation mode, wherein when the operation mode control signal from the image-receiving-side device designates the second operation mode, the even data obtained by the one-phase to two-phase converter circuit are applied to one of the first and second parallel-serial converting circuits, and the odd data obtained by the one-phase to two-phase converter circuit are applied to the other parallel-serial converting circuit.

In the above-described third image signal transmission apparatus, said image-receiving-side device comprises: a first serial-parallel converting circuit for converting the serial data, transmitted from the first parallel-serial converting circuit via the cable, to the parallel data; and a second serial-parallel converting circuit for converting the serial data, transmitted from the second parallel-serial converting circuit via the cable, to the parallel data.

The above-described first serial-parallel converting circuit includes means for performing a one-phase to two-phase conversion of the parallel data obtained by the serial-parallel conversion to provide separated even and odd data in the case when the first operation mode is selected.

The above-described means for transmitting the operation mode control signal to the image-transmitting-side device may transmit the operation mode control signal by wire or by wireless.

A fourth image signal transmission apparatus according to the present invention comprises comprising an image-transmitting-side device, an image-receiving-side device, and a cable connecting the image-transmitting-side device with the image-receiving-side device, said image-receiving-side device comprising: means for detecting the level of the signals transmitted from the image-transmitting-side device through the cable to the image-receiving-side device and for generating, in accordance with the detected signal level, a control signal for controlling the amplitude of the signals to be applied from the image-transmitting-side device to the cable; and means for transmitting the control signal to the image-transmitting-side device, said image-transmitting-side device having amplitude control means for controlling, in accordance with the control signal from the image-receiving-side device, the amplitude of the signals to be applied from the image-transmitting-side device to the cable.

In the above-described fourth image signal transmission apparatus, said amplitude control means may comprise: for example, an amplitude control circuit for changing, in accordance with the resistance value of an external amplitude control resistor, the amplitude of the signals to be applied from the image-transmitting-side device to the cable; a variable resistor circuit disposed, as the amplitude control resistor, externally to the amplitude control circuit; and means for controlling the resistance value of the variable resistor circuit in accordance with the control signal from the image-receiving-side device.

The above-described means for transmitting the control signal to the image-transmitting-side device may transmit the control signal by wire or by wireless.

DETAILED DESCRIPTION OF PREFERRED EMBODIMENTS

[1] Description of First Embodiment

A first embodiment of the present invention will be described below with reference to FIGS. 5 to 7.

Figure 5:
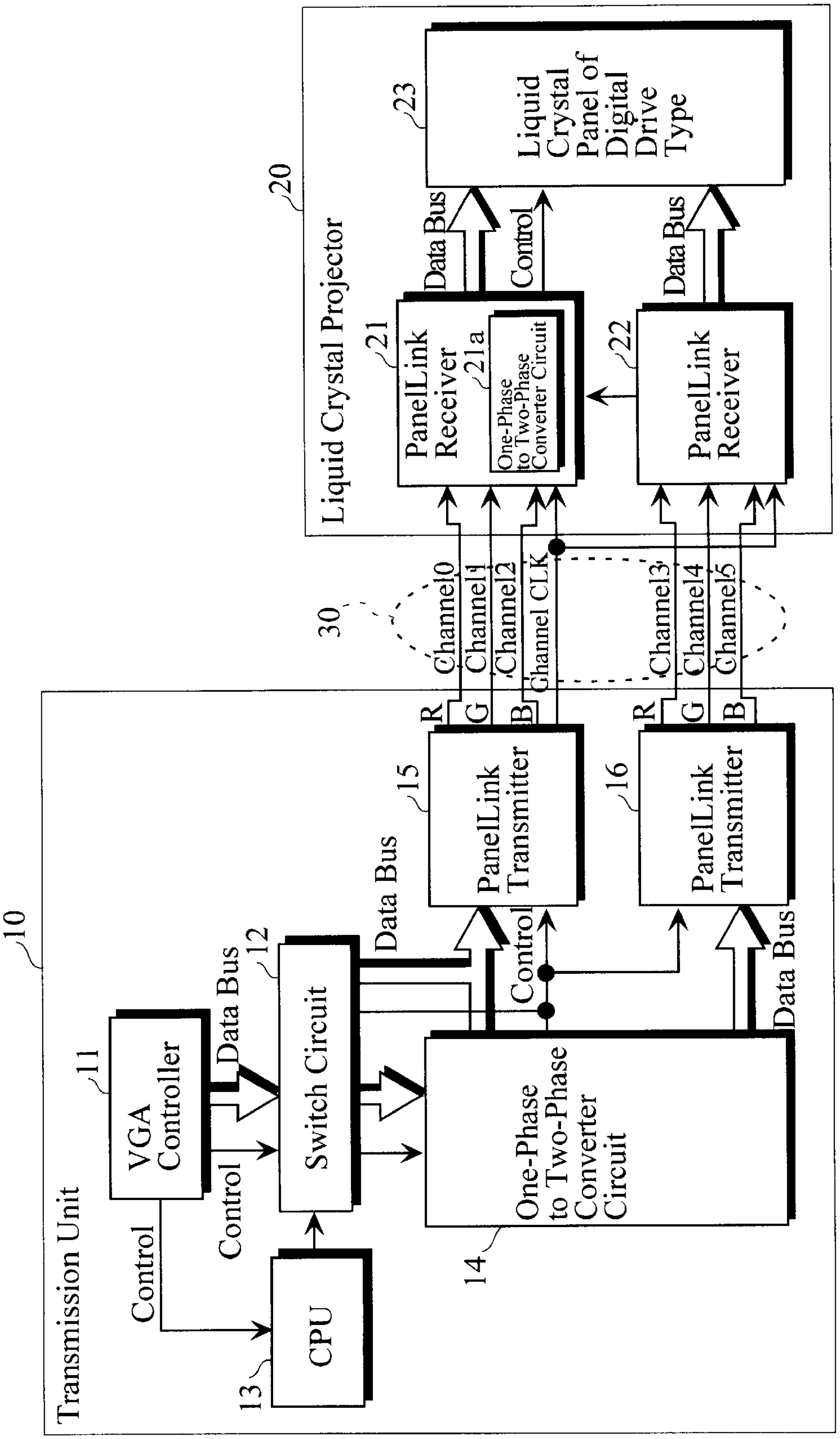
FIG. 5, showing a first embodiment, is a block diagram showing the structure of a digital image signal transmission apparatus.

FIG. 5 shows the structure of a digital image signal transmission apparatus. This image signal transmission apparatus comprises a transmission unit 10 set in a personal computer, a liquid crystal projector 20 and a cable 30 connecting them.

The transmission unit 10 includes a VGA controller (graphic chip) 11, a switch circuit 12, a CPU 13, a one-phase to two-phase converter circuit 14, a first PanelLink transmitter 15 and a second PanelLink transmitter 16.

The liquid crystal projector 20 includes a first PanelLink receiver 21, a second PanelLink receiver 22 and a liquid crystal panel 23 of digital drive type. The first PanelLink receiver 21 incorporates a one-phase to two-phase converter circuit 21*a*.

The cable 30 comprises six pairs of signal lines for transmitting image data and one pair of signal lines for transmitting a clock signal.

The CPU 13 detects which the image signals to be transmitted are of, a high resolution (equal to or lower than the resolution of SXGA) or an ultrahigh resolution (equal to or higher than the resolution of UXGA), on the basis of a control signal (or both of the control signal and image data) applied from the VGA controller 11. The CPU 13 controls the switch circuit 12 in accordance with the result of this detection.

Figure 6:
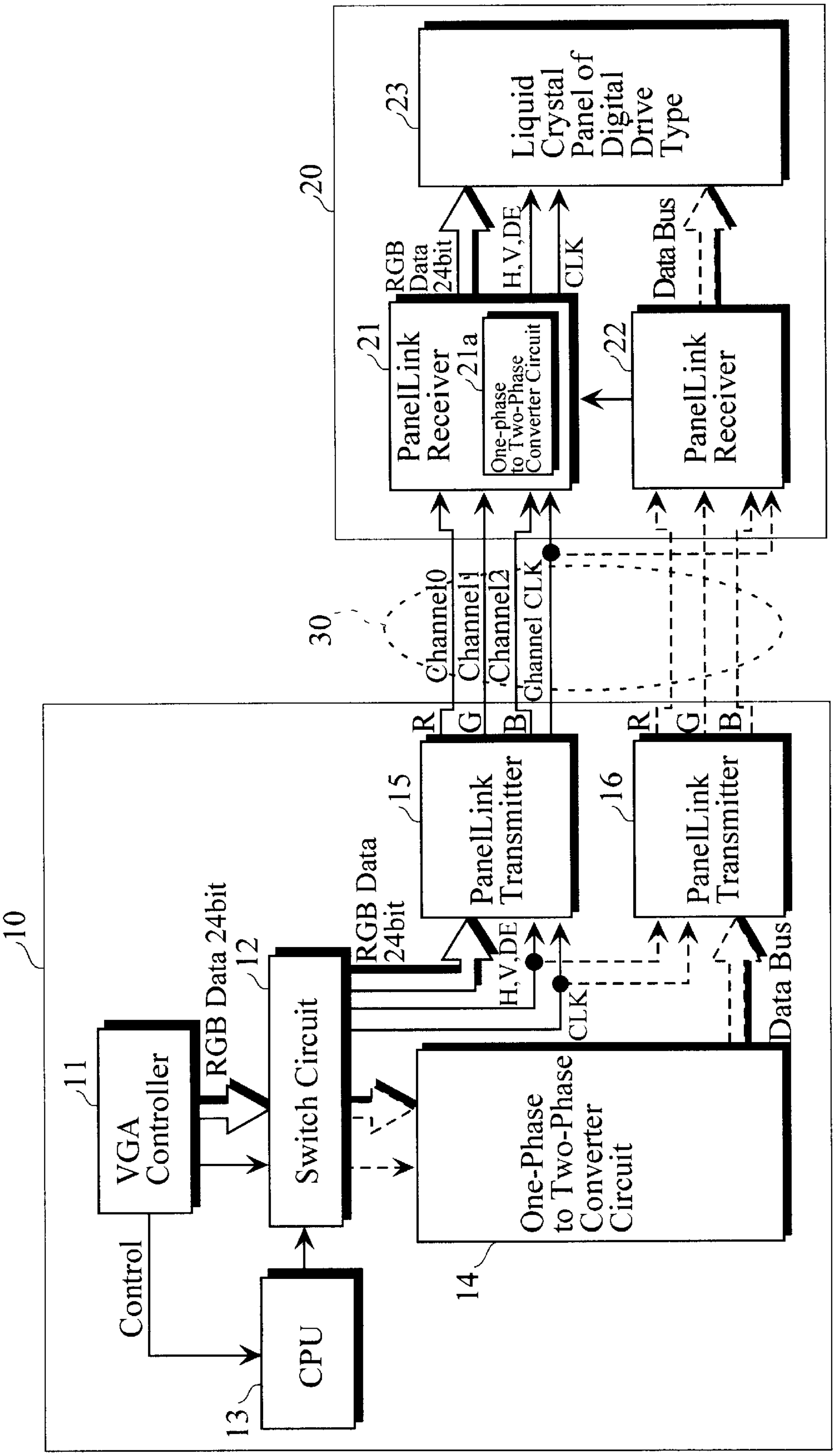
FIG. 6 is a block diagram showing the data flow in a case when CPU 13 detects that the image signals to be transmitted are of a high resolution (equal to or lower than the resolution of SXGA).

FIG. 6 shows the data flow of a case when the CPU 13 detects that the image signals to be transmitted is of a high resolution (equal to or lower than the resolution of SXGA).

Parallel image data (R, G, B) output by the VGA controller 11 are input to the first PanelLink transmitter 15 via the switch circuit 12. The PanelLink transmitter 15 converts the image data from the parallel signals to serial ones. The resultant serial R, G, and B signals each for a respective channel are transmitted through the cable 30 to the first PanelLink receiver 21, which converts the received serial signals into the parallel ones.

When the second PanelLink receiver 22 receives no image signals, the first PanelLink receiver 21 uses the one-phase to two-phase converter circuit 21*a* to perform a one-phase to two-phase conversion of the obtained parallel signals, thereby obtaining the RGB even and odd data, which are then applied to the liquid crystal panel 23 of digital drive type.

The information as to whether or not the second PanelLink receiver 22 receives any image signals is sent therefrom to the first PanelLink receiver 21.

In a case when the second PanelLink receiver 22 does receive the image signals, the first PanelLink receiver 21 applies the obtained parallel signals, as they are, to the liquid crystal panel 23.

Figure 7:
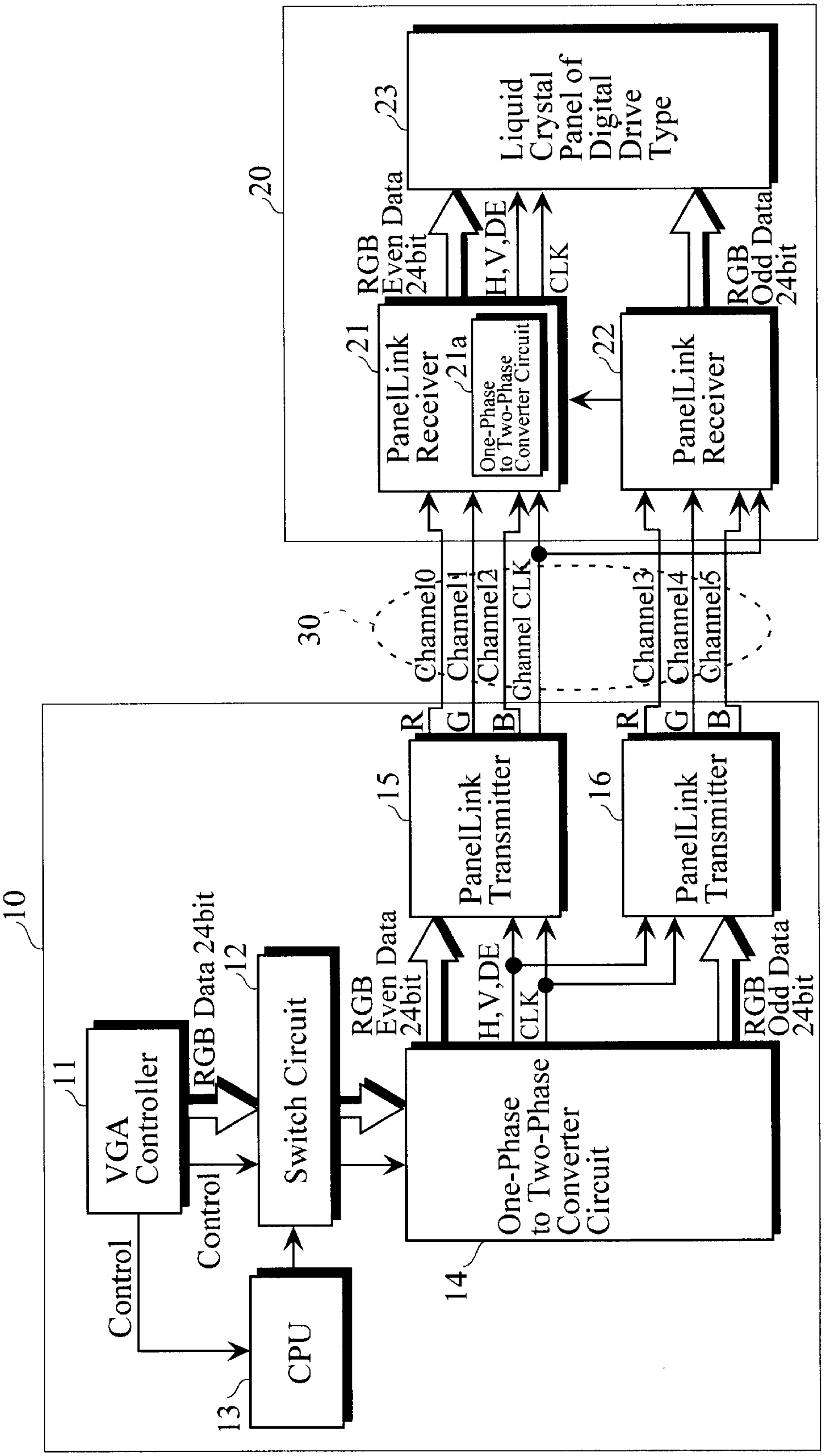
FIG. 7 is a block diagram showing the data flow in a case when CPU 13 detects that the image signals to be transmitted are of an ultrahigh resolution (equal to or higher than the resolution of UXGA).

FIG. 7 shows the data flow of a case when the CPU 13 detects that the image signals to be transmitted is of an ultrahigh resolution (equal to or higher than the resolution of UXGA).

Parallel image data (R, G, B) output by the VGA controller 11 are applied through the switch circuit 12 to the one-phase to two-phase converter circuit 14, being separated into even and odd data. The even data are applied to the first PanelLink transmitter 15, while the odd data are applied to the second PanelLink transmitter 16.

The first PanelLink transmitter 15 converts the even data from the parallel signals to serial ones. The second PanelLink transmitter 16 converts the odd data from the parallel signals to serial ones.

The serial R, G and B signals, each for two channels, obtained by PanelLink transmitters 15 and 16 are transmitted through the cable 30 to the first and second PanelLink receivers 21 and 22.

The first PanelLink receiver 21 converts the received even data from the serial signals to the parallel signals, while the second PanelLink receiver 22 converts the received odd data from the serial signals to the parallel signals.

The parallel signals, RGB even and odd data, thus obtained by the first and second PanelLink receivers 21 and 22 are applied to the liquid crystal panel 23.

In the above-described embodiment, when it is detected that the image data to be transmitted are of a high resolution, the image data are transmitted by use of the "Single Link" method. When it is detected that the image data to be transmitted are of an ultrahigh resolution, the image data are transmitted by use of the "Dual Link" method.

In the above-described first embodiment, the CPU 13 detected which the image signals to be transmitted were of, a high resolution (equal to or lower than the resolution of SXGA) or an ultrahigh resolution (equal to or higher than the resolution of UXGA), and the result of this detection was used to control the switch circuit 12. Instead, it may be arranged that the user selects, according to the resolution of the image signals to be transmitted, the high or ultrahigh resolution and that the switch circuit 12 is controlled based on his selected resolution.

[2] Description of Second Embodiment

A second embodiment will be described below with reference to FIGS. 8 to 10.

Figure 8:
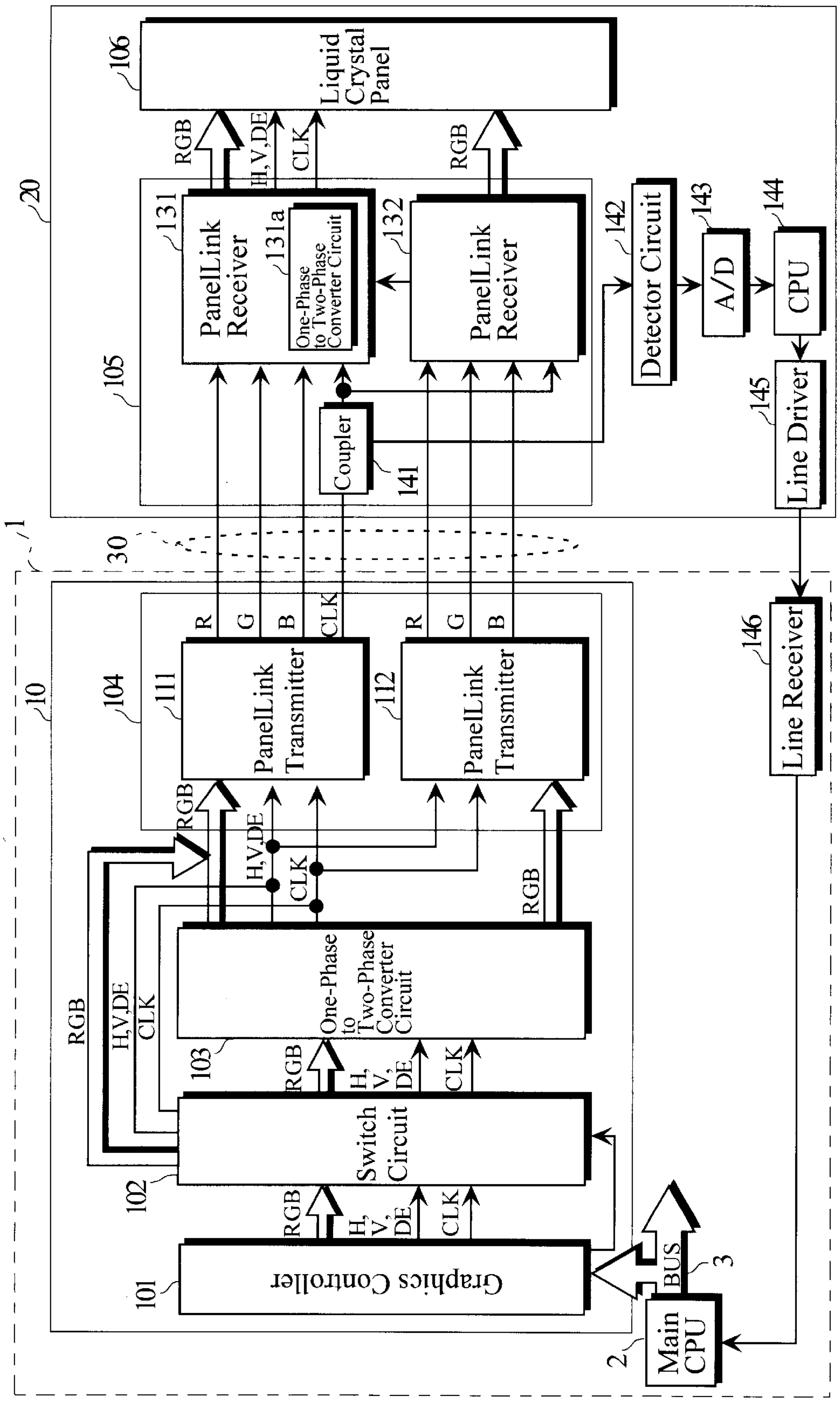
FIG. 8, showing a second embodiment, is a block diagram showing the structure of a digital image signal transmission apparatus.

FIG. 8 shows the structure of a digital image signal transmission apparatus.

This image signal transmission apparatus comprises a transmission unit 10 set in a personal computer (PC) 1, a receiving-side unit 105 set in a liquid crystal projector 20, and a cable 30 connecting the transmission unit 10 and the receiving-side unit 105.

The transmission unit 10 includes a graphics controller (graphic board) 101, a switch circuit 102, a one-phase to two-phase converter circuit 103 and a transmitting-side unit 104. The graphics controller 101 is connected to a main CPU 2 in the PC 1 via a bus 3 also therein. The main CPU 2 is connected to a line receiver 146. The transmitting-side unit 104 includes first and second PanelLink transmitters 111 and 112, respectively.

The receiving-side unit 105 in the liquid crystal projector 20 is connected to a liquid crystal panel 106 of digital drive type in the liquid crystal projector 20. The receiving-side unit 105 includes a first PanelLink receiver 131, a second PanelLink receiver 132 and a coupler 141. The first PanelLink receiver 131 incorporates a one-phase to two-phase converter circuit 131*a*. The liquid crystal projector 20 also includes a detector circuit 142, an A/D converter 143, a CPU 144 and a line driver 145.

The transmitting-side unit 104 in the transmission unit 10 is connected through the cable 30 to the receiving-side unit 105 in the liquid crystal projector 20. The cable 30 comprises six pairs of signal lines for transmitting the image data and one pair of signal lines for transmitting the clock signal.

This image signal transmission apparatus has, as its operation modes, a DualLink mode for performing the signal transmission by use of the Dual Link method, and a SingleLink mode for performing the signal transmission by use of the Single Link method.

When the SingleLink mode is selected as the operation mode, the parallel image data (R, G, B), the clock signal and the control signals (H, V, DE (Display Enable)) from the graphics controller 101 are applied through the switch circuit 102 directly to the first PanelLink transmitter 111 without being applied to the one-phase to two-phase converter circuit 103. In that case, the second PanelLink transmitter 112 is inactive in a power down mode.

The first PanelLink transmitter 111 encodes the image data and clock signal, and performs a parallel-serial conversion that converts the image data from the parallel signals to serial ones. The thus obtained serial R, G and B signals each for a respective channel are transmitted through the cable 30 to the first PanelLink receiver 131 in the receiving-side unit 105. In that case, the second PanelLink receiver 132 is inactive, entering the power down mode. The first PanelLink receiver 131 performs a data extraction, a serial-parallel conversion and a decoding with respect to the codes applied from the first PanelLink transmitter 111 in the transmitting-side unit 104, thereby producing the parallel image data, H, V and DE.

When the second PanelLink receiver 132 receives no image signals, the first PanelLink receiver 131 uses the one-phase to two-phase converter circuit 131*a* to perform a one-phase to two-phase conversion of the produced parallel image signals, and then applies the thus obtained RGB even and odd data to the liquid crystal panel 106. The first PanelLink receiver 131 also uses the one-phase to two-phase converter circuit 131*a* to perform one-half frequency divisions of the produced H, V and DE and of the received clock signal, and then applies them to the liquid crystal panel 106.

The information as to whether or not the second PanelLink receiver 132 receives any image signals is sent therefrom to the first PanelLink receiver 131.

In a case when the second PanelLink receiver 132 does receive the image signals, the first PanelLink receiver 131 applies its obtained parallel signals, as they are, to the liquid crystal panel 106.

When the DualLink mode is selected as the operation mode, the parallel image data (R, G, B) output by the graphics controller 101 are applied through the switch circuit 102 to the one-phase to two-phase converter circuit 103, being separated thereby into even and odd data. The even data are applied to the first PanelLink transmitter 111 in the transmitting-side unit 104, while the odd data are applied to the second PanelLink transmitter 112 also in the transmitting-side unit 104.

In the meantime, the clock signal and control signals (H, V, DE (Display Enable)) output by the graphics controller 101 are applied to the one-phase to two-phase converter circuit 103, being one-half frequency divided thereby, and then being applied to the first and second PanelLink transmitters 111 and 112 in the transmitting-side unit 104.

The first PanelLink transmitter 111 encodes the even data and clock signal, and performs a parallel-serial conversion that converts the even data from the parallel signals to serial ones. The second PanelLink transmitter 112 encodes the odd data and clock signal, and performs a parallel-serial conversion that converts the odd data from the parallel signals to serial ones.

The R, G and B serial signals each for two channels, obtained by the first and second PanelLink transmitters 111 and 112, are transmitted through the cable 30 to the first and second PanelLink receivers 131 and 132 in the receiving-side unit 105.

The first PanelLink receiver 131 performs a data extraction, a serial-parallel conversion and a decoding with respect to the codes applied from the first PanelLink transmitter 111, thereby producing the parallel signals with respect to the even data and also producing H, V and DE. The second PanelLink receiver 132 performs a data extraction, a serial-parallel conversion and a decoding with respect to the codes applied from the second PanelLink transmitter 112, thereby producing the parallel signals with respect to the odd data.

The parallel signals (RGB even and odd data) obtained by the first and second PanelLink receivers 131 and 132 are applied to the liquid crystal panel 106. The control signals (H, V and DE) produced by the first PanelLink receiver 131 and the clock signal received thereby are also applied to the liquid crystal panel 106.

Incidentally, the three pairs of image data of the R, G and B signals and one pair of clock signals each are transmitted as a pair of differential signals from the transmitting-side unit 104 to the receiving-side unit 105, and hence are almost at the same signal level. The transmission speed of the digital image data (the serial image data) along the cable 30 is, for example in the case of UXGA, 1.65 Gbps in the SingleLink mode, and half the same, 825 Mbps, in the DualLink mode.

Figure 9:
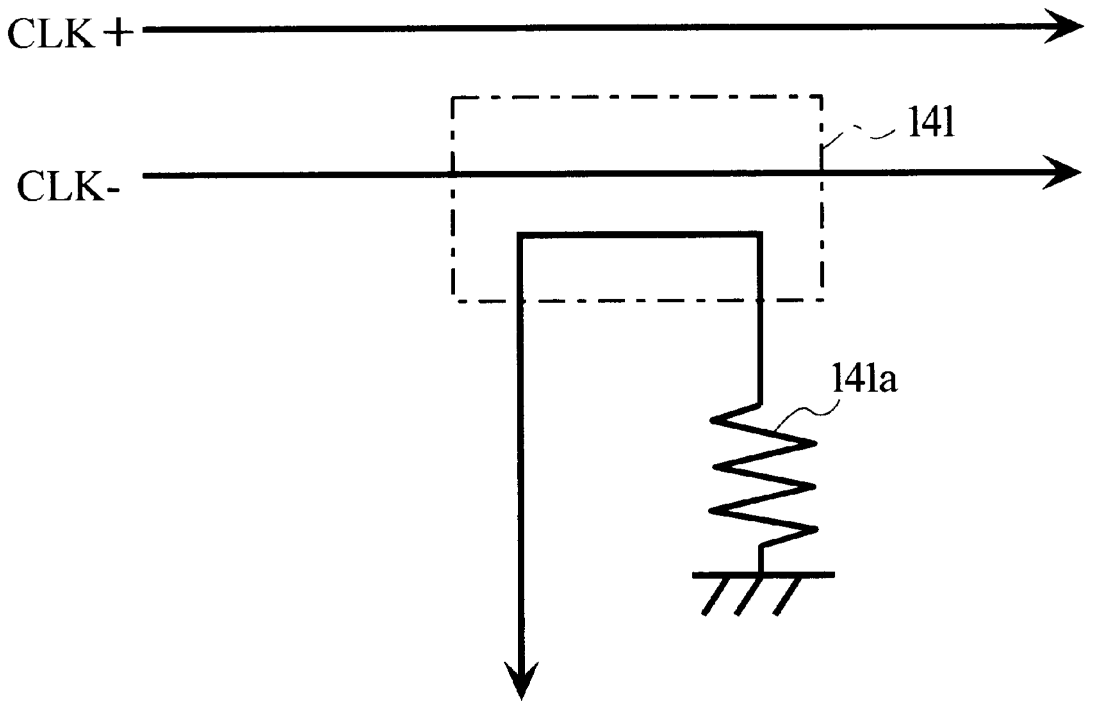
FIG. 9 is a block diagram showing the structure of a signal level detection.

In this embodiment, the coupler 141 is located on one of two signal lines for the pair of differential signals, CLK+ and CLK−, received as the clock signal, specifically, on the signal line of signal CLK−, as shown in FIG. 9, and its coupling output is applied to the detector circuit 142. The CLK+ and CLK−signal lines each exhibit a characteristic impedance of 50 ohms at the single end, and a terminating resistor 141*a* of the coupler 141 exhibits, for example, 50 ohms.

The detector circuit 142 converts the CLK−coupling output signal into an analog signal of a DC voltage proportional to the amplitude level of the CLK−coupling output signal. The detector circuit 142 may comprise, for example, an IC of AD8313 available from Analog Devices Inc.

The detection signal output by the detection circuit 142 is converted into a digital signal by the A/D converter circuit 143 and then applied to an input port of the CPU 144. The CPU 144 compares the level of the received CLK−signal with a predetermined threshold value and provides a control signal for switching the operation mode (from the SingleLink mode to the DualLink mode or vice versa). This control signal is transmitted through the line driver 145 to the line receiver 146 in the PC 1 on the transmitting side as a feedback signal.

As to the transmission of the control signal responsive to the level of the received signals to the line receiver 146 in the PC 1, in a case of using, for example, a 24-pin connector of Digital Visual Interface (DVI) standard specified as a digital interface between PCs and liquid crystal projectors or the like in the United States, its unused pin terminal 8 (NC) can be utilized, without any additional wiring, to effect a serial transmission of the one-bit control signal. Instead, however, an additional signal wiring may be used as the interface for transmitting the control signal.

The control signal received by the line receiver 146 in the PC 1 is applied to the main CPU 2. On the basis of the control signal applied to the main CPU2, the PC 1 sends an operation mode switch signal for switching between the SingleLink mode and the DualLink mode to the graphics controller 101 via the bus 3. When receiving the operation mode switch signal, the graphics controller 101 sends a control signal responsive to this operation mode switch signal to the switch circuit 102.

In this embodiment, the initial operation mode of the transmission unit 10 has been set to the SingleLink mode. When the transmission of image data to the liquid crystal projector 20 is started for the first time after turn-on of the transmission unit 10, it is decided which mode should be used as the operation mode.

In a case of using a short cable of three meters or less as the cable 30, even when the image signals to be transmitted are of a high resolution of UXGA that exhibits a transmission speed of 1.65 Gbps in the Single Link method, the attenuation amount of the signals transmitted through the cable 30 is less than five or six dB. Thus, the SingleLink mode can be used to provide a sufficient C/N ratio to reproduce the received signals without any errors.

In such a case, the amplitude of a CLK−coupling output signal developed by the coupler 141 is large, and the amplitude level of a signal output by the detector circuit 142 is high. Thus, the CPU 144 develops a control signal for selecting the SingleLink mode as the operation mode. This control signal is conveyed through the line driver 145 to the transmitting side. When receiving this control signal, the main CPU 2 in the PC 1 selects the SingleLink mode as the operation mode and applies an operation mode switch signal responsive to this mode selection to the graphics controller 101. The graphics controller 101 then applies a switch control signal for the SingleLink mode to the switch circuit 102. As a result, the initial operation mode (SingleLink mode) remains unchanged.

In a case of using a long cable of ten meters or more as the cable 30, when the image signals to be transmitted are of a high resolution of UXGA that exhibits a transmission speed of 1.65 Gbps in the Single Link method, the attenuation amount of the signals transmitted through the cable 30 is 20 dB or so. Thus, the SingleLink mode cannot be used to provide any sufficient C/N ratio to reproduce the received signals to a normal degree.

In such a case, the amplitude of a CLK−coupling output signal developed by the coupler 141 is small, and the amplitude level of a signal output by the detector circuit 142 is low. Thus, the CPU 144 develops a control signal for selecting the DualLink mode as the operation mode. This control signal is conveyed through the line driver 145 to the transmitting side. When receiving this control signal, the main CPU 2 in the PC 1 selects the DualLink mode as the operation mode and applies an operation mode switch signal responsive to this mode selection to the graphics controller 101. The graphics controller 101 then applies a switch control signal for the DualLink mode to the switch circuit 102. As a result, the initial operation mode (SingleLink mode) is switched to the DualLink mode.

When the operation mode is thus switched to the DualLink mode, the transmission speed of the signals through the cable 30 is reduced to 825 Mbps, and the attenuation amount of the signals through the cable 30 is reduced to, for example, 10 dB or so, resulting in a sufficient C/N ratio to reproduce the received signals.

In a case of using a cable of five meters as the cable 30, it is possible for the Single Link method to transmit UXGA resolution signals. However, when QXGA resolution signals, the transmission speed of which is higher, are transmitted, the amplitude of a CLK− coupling output signal developed by the coupler 141 is small and hence the amplitude level of a signal output by the detector circuit 142 is low. Consequently, the operation mode is automatically switched from the SingleLink mode to the DualLink mode in the same manner as stated above, resulting in a reproduction of the received signals without any errors.

According to the second embodiment described above, an appropriate transmission method, either the Single Link method or the Dual Link method, can automatically be selected, as the method for transmitting the signals from the transmitting-side unit, in accordance with the resolution of the image data to be transmitted and the length of the cable actually used.

In the second embodiment described above, the coupler 141 was located on the CLK− signal line, but it may be located on the CLK+signal line, or on any one of the other RXR+, RXR−, RXG+, RXG−, RXB+, and RXB−image signal lines.

Figure 10:
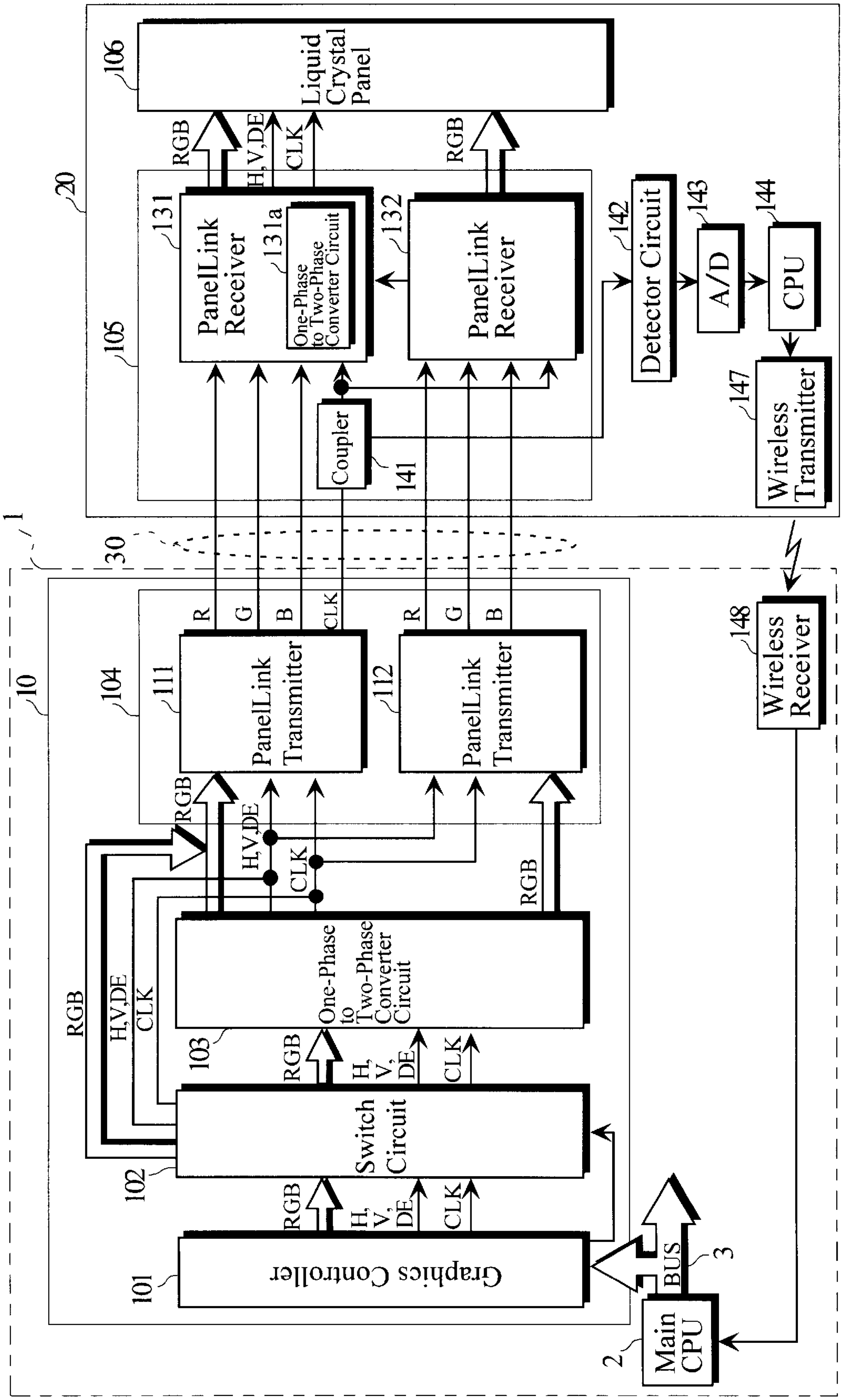
FIG. 10 is a block diagram showing an example of modification of the second embodiment.

Additionally, as shown in FIG. 10, the transmission of the control signal from the liquid crystal projector 20 on the receiving side to the PC 1 on the transmitting side may be effected by use of a wireless interface such that the control signal output by the CPU 144 is transmitted from a wireless transmitter 147 and received by a wireless receiver 148.

[3] Description of Third Embodiment

A third embodiment will be described blow with reference to FIGS. 11 to 14.

Figure 1:
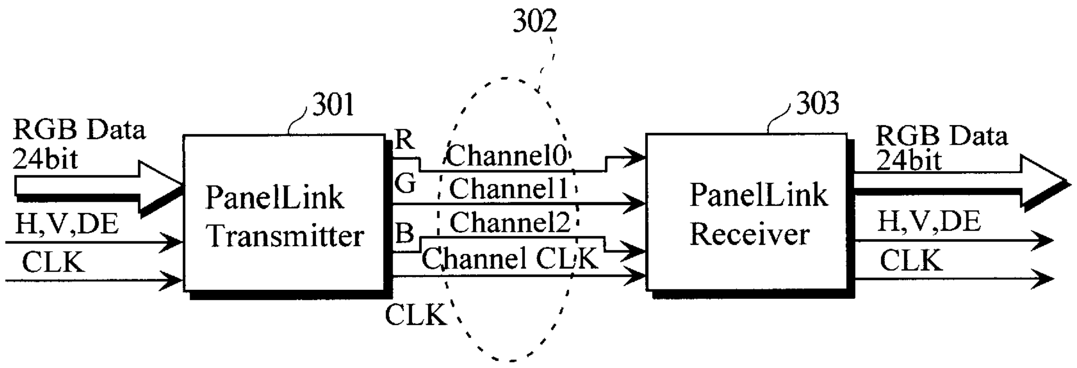
FIG. 1 is a block diagram showing the structure of an image signal transmission apparatus employing the "Single Link" method.
Figure 2:
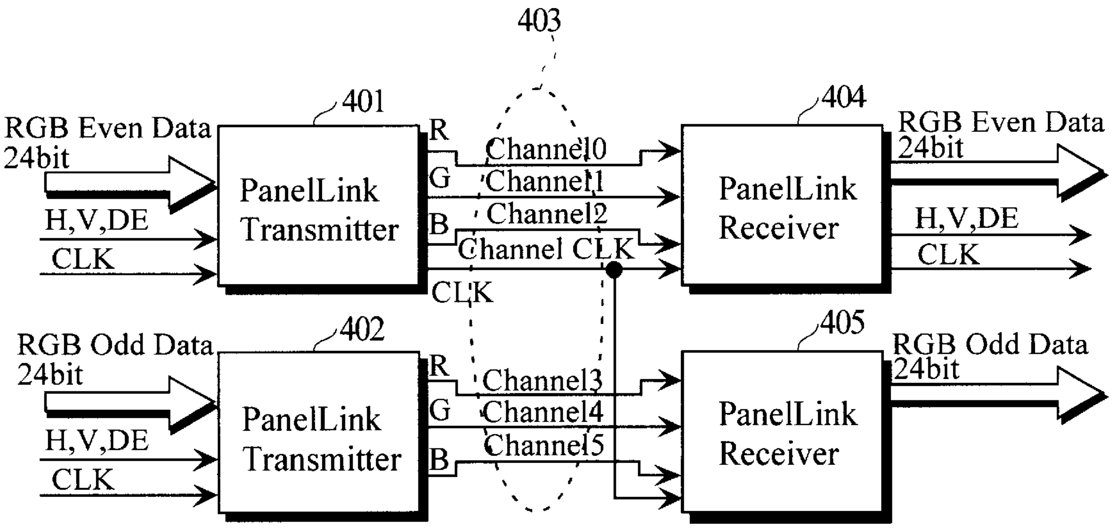
FIG. 2 is a block diagram showing the structure of an image signal transmission apparatus employing the "Dual Link" method.
Figure 3:
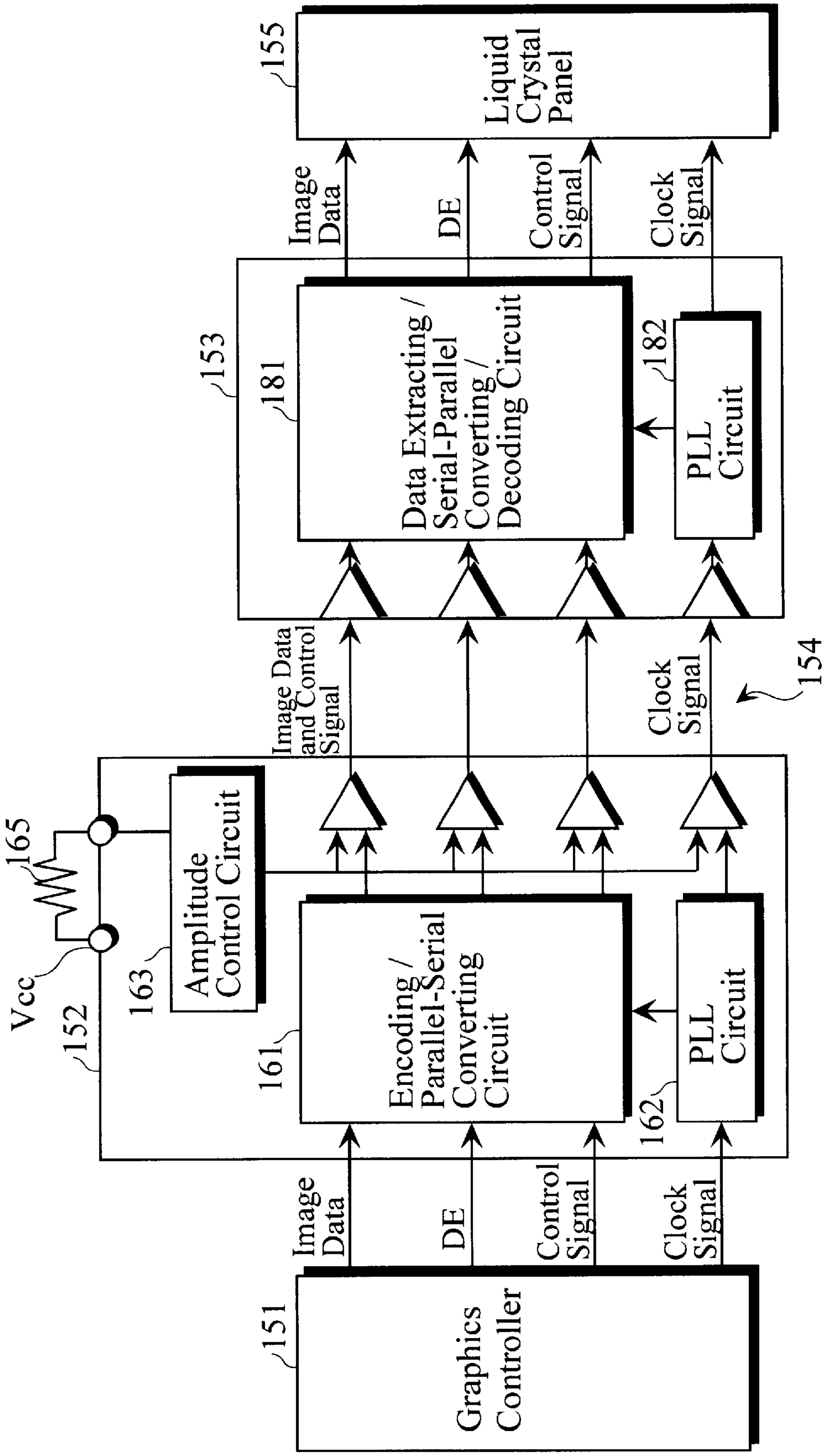
FIG. 3 is a block diagram showing the structure of "PanelLink."
Figure 4:
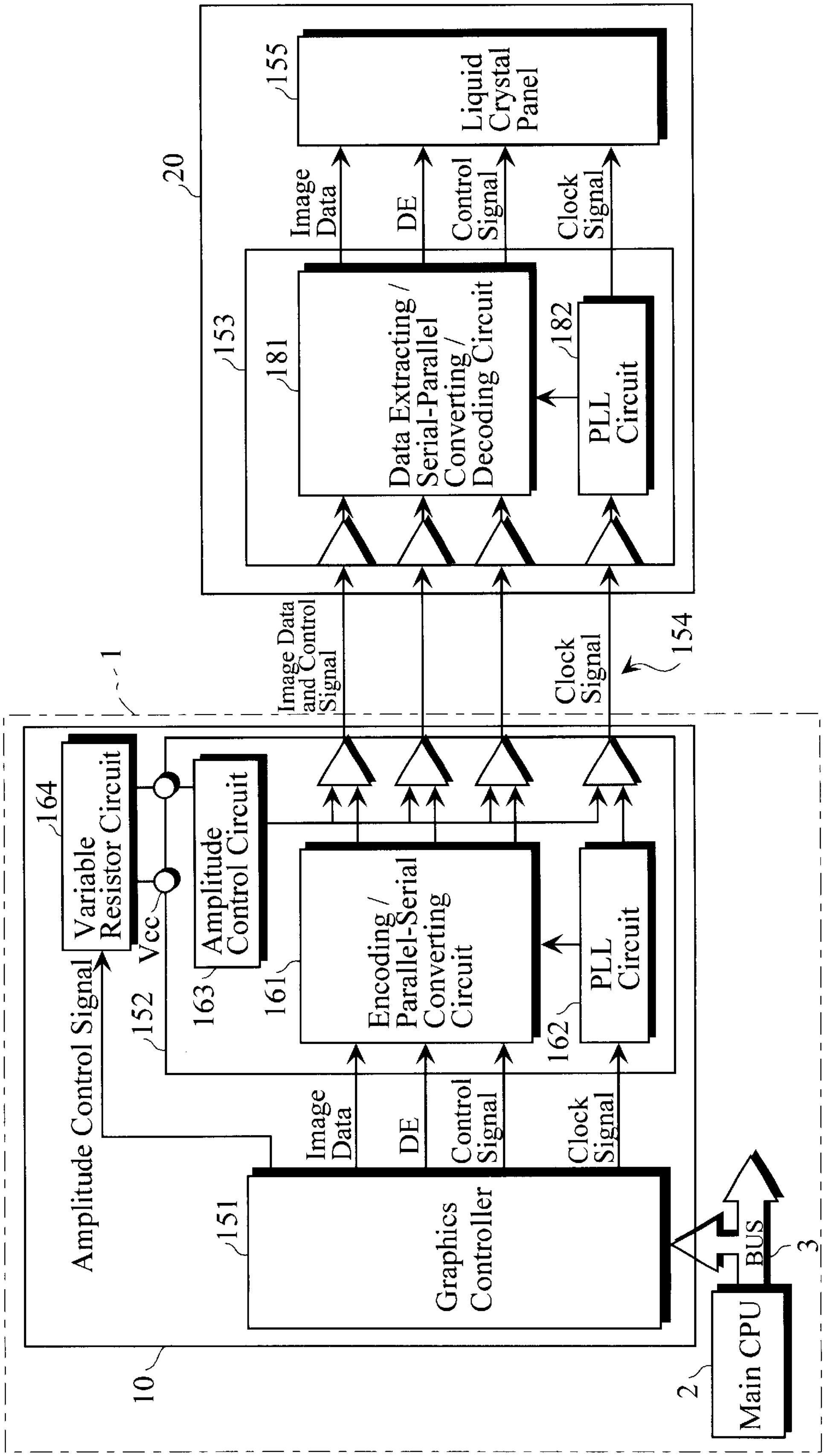
FIG. 4 is a block diagram showing the structure of an image transmitting system that has already been developed by the Applicant of the subject application.
Figure 11:
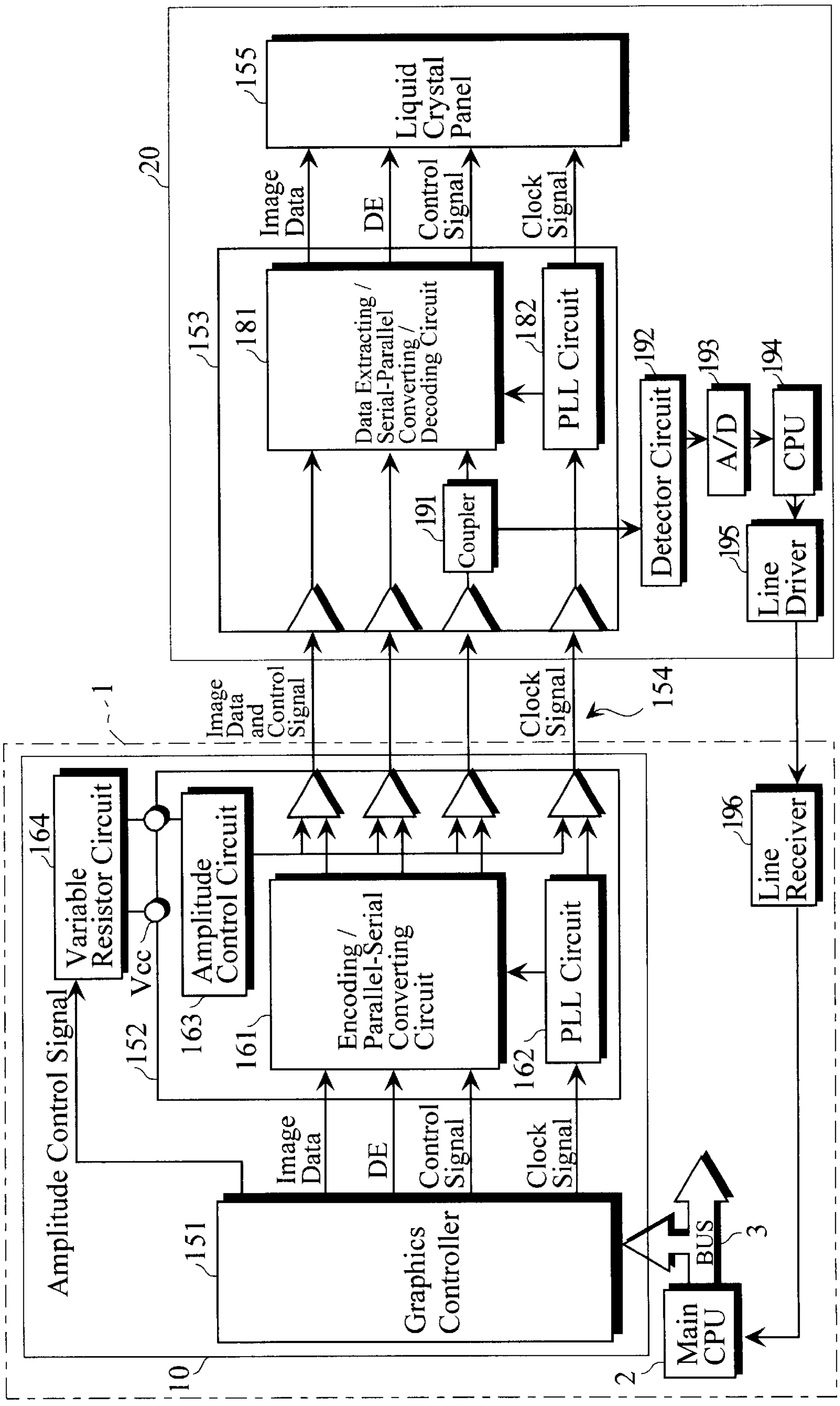
FIG. 11, showing a third embodiment, is a block diagram showing the structure of an image transmitting system.

FIG. 11 shows the structure of an image signal transmission apparatus. In FIG. 11, elements corresponding to the same elements in FIGS. 3 and 4 are identified by the same reference designations.

This image signal transmission apparatus comprises a transmission unit 10 set in a personal computer PC 1, a receiving-side unit 153 set in a liquid crystal projector 20, and a cable 154 connecting the transmission unit 10 and the receiving-side unit 153.

The transmission unit 10 comprises a graphics controller (graphics board) 151 and a transmitting-side unit 152 connected thereto. The graphics controller 151 is connected to a main CPU 2 in the PC 1 via a bus 3 also therein. The transmitting-side unit 152 in the transmission unit 10 is connected to the receiving-side unit 153 via the cable 154. The main CPU 2 is connected to a line receiver 196.

The receiving-side unit 153 in the liquid crystal projector 20 is connected to a liquid crystal panel 155 of digital drive type in the liquid crystal projector 20. The liquid crystal projector 20 also includes a detector circuit 192, an A/D converter 193, a CPU 194 and a line driver 195.

The transmitting-side unit 152 includes an encoding/parallel-serial converting circuit 161, a PLL circuit 162, and an amplitude control circuit 163. The encoding/parallel-serial converting circuit 161 receives image data, DE (a display enable signal) and a control signal from the graphics controller 151. In the encoding/parallel-serial converting circuit 161, a parallel-serial conversion of the 24-bit parallel image data is performed. Then, the signal amplitude is reduced so as to effect a reduction of EMI noise. Additionally, an encoding is performed at the time of the parallel-serial conversion. When this encoding is performed, the variation of the level of the signals to be transmitted is reduced so as to further reduce the EMI noise.

The PLL circuit 162 generates a clock signal for the encoding/parallel-serial converting circuit 161 on the basis of a clock signal applied from the graphics controller 151.

The cable 154 comprises three pairs of signal lines for transmitting the codes including both the image data and the control signal, and one pair of signal lines for transmitting the clock signal generated by the PLL circuit 162.

Figure 12:
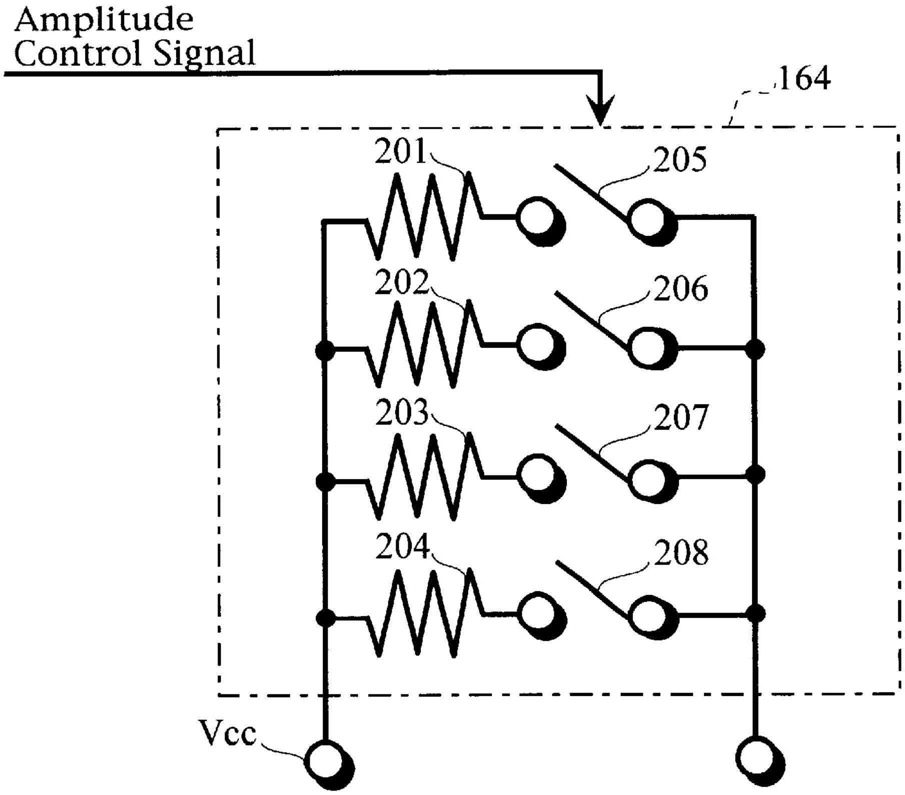
FIG. 12 is a block diagram showing the structure of a transmission apparatus.

The amplitude control circuit 163 adjusts, in accordance with the resistance value of an external variable resistor circuit 164, the amplitude of the signals (i.e., the codes including both the image data and the control signal, and the clock signal) to be applied from the transmitting-side unit 152 to the cable 154. As shown in FIG. 12, the variable resistor circuit 164 comprises a parallel combination of a series circuit of a first resistor 201 and a first switch 205, a series circuit of a second resistor 202 and a second switch 206, a series circuit of a third resistor 203 and a third switch 207, and a series circuit of a fourth resistor 204 and a fourth switch 208.

For example, the resistance value of the first resistor 201 is 820 ohms, that of the second resistor 202 is 620 ohms, that of the third resistor 203 is 390 ohms, and that of the fourth resistor 204 is 180 ohms.

The switches 205 to 208 are controlled by a 2-bit amplitude control signal (00, 01, 10, 11). When the amplitude control signal is, for example, "00", the first switch 205 only is turned on, the other switches 206, 207 and 208 being turned off. In that case, the variable resistor circuit 164 exhibits the resistance value of 820 ohms.

When the amplitude control signal is, for example, "01", the second switch 206 only is turned on, the other switches 205, 207 and 208 being turned off. In that case, the variable resistor circuit 164 exhibits the resistance value of 620 ohms.

When the amplitude control signal is, for example, "10", the third switch 207 only is turned on, the other switches 205, 206 and 208 being turned off. In that case, the variable resistor circuit 164 exhibits the resistance value of 390 ohms.

When the amplitude control signal is, for example, "11", the fourth switch 208 only is turned on, the other switches 205, 206 and 207 being turned off. In that case, the variable resistor circuit 164 exhibits the resistance value of 180 ohms.

In this way, the resistance value of the variable resistor circuit 164 can be switched among the four values. In other words, the on/off control of the switches 205, 206, 207 and 208 can switch, among four values, the amplitude of the signals to be applied from the transmitting-side unit 152 to the cable 154.

The receiving-side unit 153 includes a data extracting/serial-parallel converting/decoding circuit 181, a PLL circuit 182 and a coupler 191. The data extracting/serial-parallel converting/decoding circuit 181 performs a data extraction, a serial-parallel conversion and a decoding with respect to the codes applied from the transmitting-side unit 152 to produce the image data, DE and the control signal.

The PLL circuit 182 produces a clock signal for the data extracting/serial-parallel converting/decoding circuit 181 on the basis of the clock signal applied from the transmitting-side unit 152. The image data, DE and control signal produced by the data extracting/serial-parallel converting/decoding circuit 181 and the clock signal produced by the PLL circuit 182 are applied to the liquid crystal panel 155.

The three pairs of image data of R, G and B signals each pair are transmitted as a pair of differential signals from the transmitting-side unit 152 to the receiving-side unit 153, and hence are almost at the same signal level. The transmission speed of the digital image data (the serial image data) along the cable is, for example in a case of SXGA signals, 1.08 Gbps.

Figure 13:
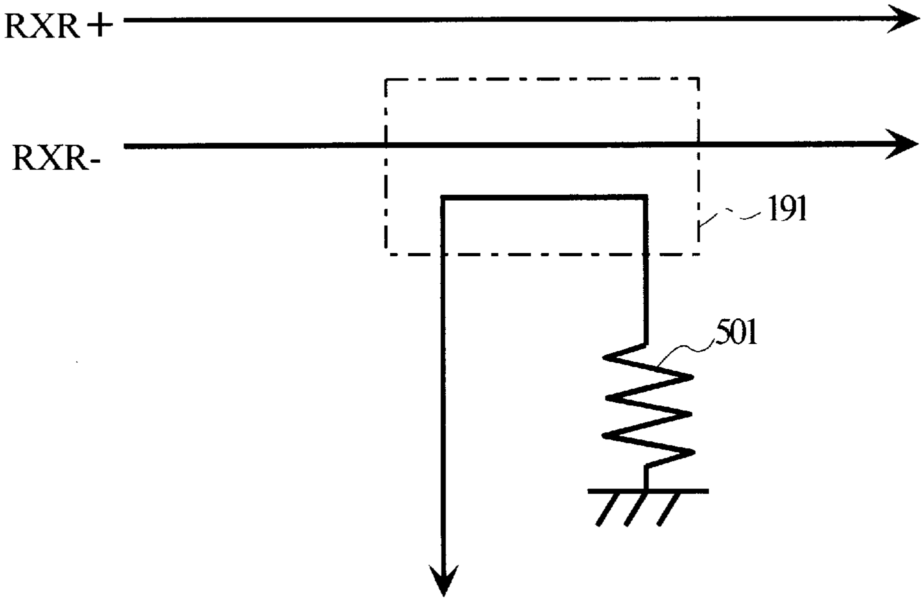
FIG. 13 is a block diagram showing the structure of a signal level detection.

In this embodiment, the coupler 191 is located on one of two signal lines for the pair of differential signals, RXR+and RXR−, received as the R signal, specifically, on the line for the signal RXR−, as shown in FIG. 13, and its coupling output is applied to the detector circuit 192. The RXR+and RXR−signal lines each exhibit a characteristic impedance of 50 ohms at the single end, and a terminating resistor 501 of the coupler 191 exhibits, for example, 50 ohms.

The detector circuit 192 converts the RXR−coupling output signal into an analog signal of a DC voltage proportional to the amplitude level of the RXR−coupling output signal. The detector circuit 192 may comprise, for example, an IC of AD8313 available from Analog Devices Inc.

A detection signal output by the detection circuit 192 is converted into a digital signal by the AID converter circuit 193 and then applied to an input port of the CPU 194. The CPU 194 provides, in response to the level of the RXR−received signal, a control signal to be conveyed so as to change the level of the signals to be transmitted from the transmitting side. This control signal is conveyed through the line driver 195 to the line receiver 196 in the PC 1 on the transmitting side as a feedback signal.

As to the transmission of the control signal responsive to the level of the received signals to the line receiver 196 in the PC 1, in a case of using, for example, a 24-pin connector of Digital Visual Interface (DVI) standard specified as a digital interface between PCs and liquid crystal projectors or the like in the United States, its unused pin terminal 8 (NC) can be utilized, without any additional wiring, to effect a serial transmission of the one-bit control signal. Instead, however, an additional signal wiring may be used as the interface for transmitting the control signal.

The control signal received by the line receiver 196 in the PC 1 is applied to the main CPU 2. On the basis of the control signal applied to the main CPU 2, the PC 1 sends a command signal (amplitude command signal) to the graphics controller 151 via the bus 3. When receiving the command signal, the graphics controller 151 applies an amplitude control signal responsive to this command signal to the variable resistor circuit 164.

In a case of using a short cable of one meter or less as the cable 154, the amplitude of a RXR−coupling output signal developed by the coupler 191 is large, and the amplitude level of the signal output by the detector circuit 192 is high. Thus, the aforementioned control signal, developed by the CPU 194, to be conveyed so as to change the level of the signals to be transmitted from the transmitting side is conveyed through the line driver 195 to the transmitting side so as to reduce the amplitude level of the signals to be transmitted from the transmitting side.

On the basis of the control signal conveyed from the receiving side, the PC 1 applies a command signal (amplitude command signal) through the bus 3 to the graphics controller 151, which then provides a 2-bit amplitude control signal of "00". In that case, the switch 205 is in the on-state, while the other switches 206 to 208 being in the off-state. Thus, the variable resistor circuit 164 exhibits the largest one of the four resistance values, 820 ohms, so that the amplitude of the signals to be applied from the transmitting-side unit 152 to the cable 154 becomes the smallest one of the four amplitude values.

In a case of using a long cable of ten meters or more as the cable 154, the amplitude of a RXR− coupling output signal developed by the coupler 191 is small, and the amplitude level of a signal output by the detector circuit 192 is low. Thus, the aforementioned control signal, developed by the CPU 194, to be conveyed so as to change the level of the signals to be transmitted from the transmitting side is conveyed through the line driver 195 to the transmitting side so as to raise the amplitude level of the signals to be transmitted from the transmitting side.

On the basis of the control signal conveyed from the receiving side, the PC 1 applies a command signal (amplitude command signal) through the bus 3 to the graphics controller 151, which then provides a 2-bit amplitude control signal of "11". In that case, the switch 208 is in the on-state, while the other switches 205 to 207 being in the off-state. Thus, the variable resistor circuit 164 exhibits the smallest one of the four resistance values, 180 ohms, so that the amplitude of the signals to be applied from the transmitting-side unit 152 to the cable 154 is the largest one of the four amplitude values.

According to the third embodiment described above, the PC 1, in which the graphics controller 151 has been set, can automatically adjust the amplitude of the signals to be applied from the transmitting-side unit 152 to the cable 154 so that the amplitude level of the image data will be appropriate on the receiving side.

The third embodiment was described above with respect to the case of adjusting, among the four values, the amplitude of the signals to be applied from the transmitting-side unit 152 to the cable 154. The present invention, however, is not limited only to this number of signal amplitude values but may be applied to any other number of signal amplitude values.

In the third embodiment described above, the coupler 191 was located on the RXR−signal line, but it may be located on the RXR+ signal line, or on any one of the other RXG+, RXG−, RXB+, and RXB− image signal lines.

Figure 14:
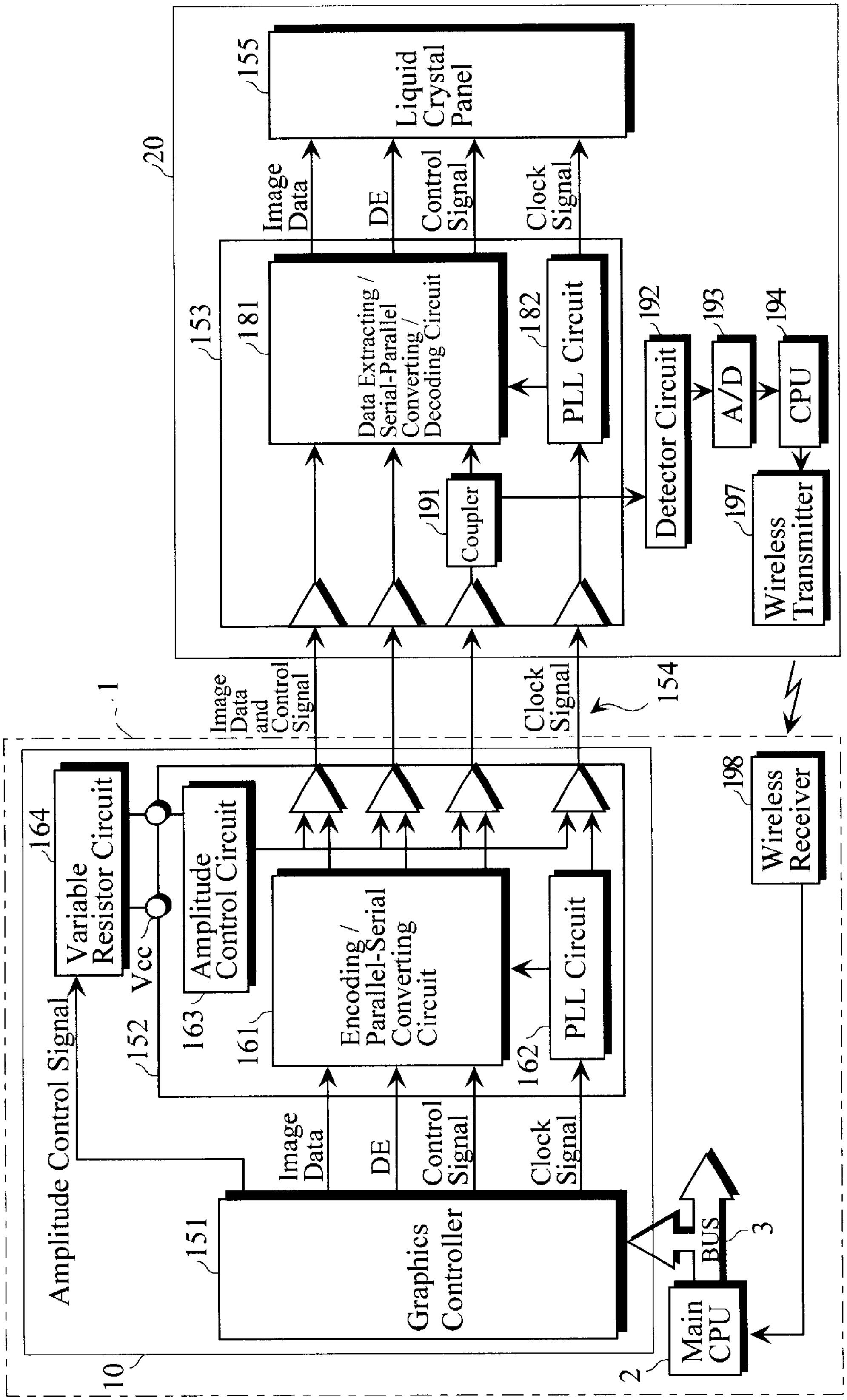
FIG. 14 is a block diagram showing an example of modification of the third embodiment.

Additionally, as shown in FIG. 14, the transmission of the control signal from the liquid crystal projector 20 on the receiving side to the PC 1 on the transmitting side may be effected by use of a wireless interface such that the control signal output by the CPU 194 is transmitted from a wireless transmitter 197 and received by a wireless receiver 198.

What is claimed is:

1. An image signal transmission apparatus, which performs a parallel-serial conversion of parallel image data by use of an image-transmitting-side device, thereafter transmits the image data to an image-receiving-side device via a cable, and then performs a serial-parallel conversion of the received image data by use of the image-receiving-side device, said image-transmitting-side device comprising:

a one-phase to two-phase converter circuit for separating the parallel image data, which are to be transmitted, into even and odd data;

a first parallel-serial converting circuit;

a second parallel-serial converting circuit;

means for allowing a user to select, as the resolution mode for the image data to be transmitted, one of a first resolution mode and a second resolution mode that is higher in resolution than the first resolution mode; and switch means for applying the parallel image data, which are to be transmitted, to the first parallel-serial converting circuit when the first resolution mode is selected, and for applying the parallel image data, which are to be transmitted, to the one-phase to two-phase converter circuit when the second resolution mode is selected;

wherein when the second resolution mode is selected, the even data obtained by the one-phase to two-phase converter circuit are applied to one of the first and second parallel-serial converting circuits, and the odd data obtained by the one-phase to two-phase converter circuit are applied to the other parallel-serial converting circuit.

2. The image signal transmission apparatus as set forth in claim 1, wherein said image-receiving-side device comprises:

a first serial-parallel converting circuit for converting the serial data, transmitted from the first parallel-serial converting circuit via the cable, to the parallel data; and a second serial-parallel converting circuit for converting the serial data, transmitted from the second parallel-serial converting circuit via the cable, to the parallel data.

3. The image signal transmission apparatus as set forth in claim 2, wherein said first serial-parallel converting circuit includes means for performing a one-phase to two-phase conversion of the parallel data obtained by the serial-parallel conversion to provide separated even and odd data in the case when the first resolution mode is selected.

4. An image signal transmission apparatus, which performs a parallel-serial conversion of parallel image data by use of an image-transmitting-side device, thereafter transmits the image data to an image-receiving-side device via a cable, and then performs a serial-parallel conversion of the received image data by use of the image-receiving-side device, said image-transmitting-side device comprising:

a one-phase to two-phase converter circuit for separating the parallel image data, which are to be transmitted, into even and odd data;

a first parallel-serial converting circuit;

a second parallel-serial converting circuit;

means for automatically determining the resolution of the image data to be transmitted, and then automatically selecting, as the resolution mode for the image data to be transmitted, one of a first resolution mode and a second resolution mode that is higher in resolution than the first resolution mode; and switch means for applying the parallel image data, which are to be transmitted, to the first parallel-serial converting circuit when the first resolution mode is selected, and for applying the parallel image data, which are to be transmitted, to the one-phase to two-phase converter circuit when the second resolution mode is selected;

wherein when the second resolution mode is selected, the even data obtained by the one-phase to two-phase converter circuit are applied to one of the first and second parallel-serial converting circuits, and the odd data obtained by the one-phase to two-phase converter circuit are applied to the other parallel-serial converting circuit.

5. The image signal transmission apparatus as set forth in claim 4, wherein said image-receiving-side device comprises:

a first serial-parallel converting circuit for converting the serial data, transmitted from the first parallel-serial converting circuit via the cable, to the parallel data; and a second serial-parallel converting circuit for converting the serial data, transmitted from the second parallel-serial converting circuit via the cable, to the parallel data.

6. The image signal transmission apparatus as set forth in claim 5, wherein said first serial-parallel converting circuit includes means for performing a one-phase to two-phase conversion of the parallel data obtained by the serial-parallel conversion to provide separated even and odd data in the case when the first resolution mode is selected.

7. An image signal transmission apparatus, which performs a parallel-serial conversion of parallel image data by use of an image-transmitting-side device, thereafter transmits the image data to an image-receiving-side device via a cable, and then performs a serial-parallel conversion of the received image data by use of the image-receiving-side device, said image-receiving-side device comprising: means for detecting the level of the signals transmitted from the image-transmitting-side device through the cable to the image-receiving-side device and for generating an operation mode control signal for designating a first operation mode when the detected signal level is higher than a predetermined value and for designating a second operation mode when the detected signal level is equal to or lower than the predetermined value; and means for transmitting the operation mode control signal to the image-transmitting-side device, said image-transmitting-side device comprising: a one-phase to two-phase converter circuit for separating the parallel image data, which are to be transmitted, into even and odd data; a first parallel-serial converting circuit; a second parallel-serial converting circuit; and switch means for applying the parallel image data, which are to be transmitted, to the first parallel-serial converting circuit when the operation mode control signal from the image-receiving-side device designates the first operation mode, and for applying the parallel image data, which are to be transmitted, to the one-phase to two-phase converter circuit when the operation mode control signal from the image-receiving-side device designates the second operation mode, wherein when the operation mode control signal from the image-receiving-side device designates the second operation mode, the even data obtained by the one-phase to two-phase converter circuit are applied to one of the first and second parallel-serial converting circuits, and the odd data obtained by the one-phase to two-phase converter circuit are applied to the other parallel-serial converting circuit.

8. The image signal transmission apparatus as set forth in claim 7, wherein said image-receiving-side device comprises:

a first serial-parallel converting circuit for converting the serial data, transmitted from the first parallel-serial converting circuit via the cable, to the parallel data; and a second serial-parallel converting circuit for converting the serial data, transmitted from the second parallel-serial converting circuit via the cable, to the parallel data.

9. The image signal transmission apparatus as set forth in claim 8, wherein said first serial-parallel converting circuit includes means for performing a one-phase to two-phase conversion of the parallel data obtained by the serial-parallel conversion to provide separated even and odd data in the case when the first operation mode is selected.

10. The image signal transmission apparatus as set forth in claim 7, wherein said means for transmitting the operation mode control signal to the image-transmitting-side device transmits the operation mode control signal by wire.

11. The image signal transmission apparatus as set forth in claim 7, wherein said means for transmitting the operation mode control signal to the image-transmitting-side device transmits the operation mode control signal by wireless.

12. An image signal transmission apparatus comprising:

an image-transmitting-side device, an image-receiving-side device, and a cable connecting the image-transmitting-side device with the image-receiving-side device, said image-receiving-side device comprising:

means for detecting the level of the signals transmitted from the image-transmitting-side device through the cable to the image-receiving-side device and for generating, in accordance with the detected signal level, a control signal for controlling the amplitude of the signals to be applied from the image-transmitting-side device to the cable; and means for transmitting the control signal to the image-transmitting-side device, wherein said image-transmitting-side device has amplitude control means for controlling, in accordance with the control signal from the image-receiving-side device, the amplitude of the signals to be applied from the image-transmitting-side device to the cable, and wherein said amplitude control means comprises:

an amplitude control circuit for changing, in accordance with the resistance value of an external amplitude control resistor, the amplitude of the signals to the applied from the image-transmitting-side device to the cable;

a variable resistor circuit disposed, as the amplitude control resistor, externally to the amplitude control circuit; and means for controlling the resistance value of the variable resistor circuit in accordance with the control signal form the image-receiving-side device.

* * * * *